US011301160B2

(12) United States Patent
Barinov

(10) Patent No.: US 11,301,160 B2
(45) Date of Patent: Apr. 12, 2022

(54) SYSTEM AND METHOD FOR A REPLICATION PROTOCOL IN A REAL-TIME STATISTICAL ENGINE

(71) Applicant: Genesys Telecommunications Laboratories, Inc., Daly City, CA (US)

(72) Inventor: Vitaly Y. Barinov, Clayton, CA (US)

( * ) Notice: Subject to any disclaimer, the term of this patent is extended or adjusted under 35 U.S.C. 154(b) by 523 days.

(21) Appl. No.: 16/446,092

(22) Filed: Jun. 19, 2019

(65) Prior Publication Data

US 2019/0391741 A1 Dec. 26, 2019

Related U.S. Application Data

(60) Provisional application No. 62/687,324, filed on Jun. 20, 2018.

(51) Int. Cl.
G06F 3/06 (2006.01)
G06F 9/448 (2018.01)
H04L 29/06 (2006.01)

(52) U.S. Cl.
CPC .............. *G06F 3/065* (2013.01); *G06F 3/067* (2013.01); *G06F 3/0619* (2013.01); *G06F 9/4498* (2018.02); *H04L 63/12* (2013.01)

(58) Field of Classification Search
CPC ........ G06F 3/065; G06F 3/0619; G06F 3/067; G06F 9/4498; H04L 63/12
See application file for complete search history.

(56) References Cited

U.S. PATENT DOCUMENTS

2014/0215112 A1* 7/2014 Iyer ..................... G06F 13/4282
710/106
2014/0310243 A1* 10/2014 McGee .................. G06F 16/27
707/639

* cited by examiner

*Primary Examiner* — Jigar P Patel

(57) ABSTRACT

A system and method are presented for a replication protocol in a real-time statistical engine. A real-time statistical engine monitors external data sources and uses received data to derive on-demand statistics. The engine may be comprised of a plurality of instances. In an embodiment with two instances of the engine, the instances are labeled as a primary instance and a backup instance. In case of primary instance failure, client servers of the engine are able to connect to the backup instance and obtain the same statistics with minimal data loss. The communication system between the primary instance and the backup instance may be used to exchange information about requested statistics, to clean unused statistics and to unconditionally delete statistics for which computation has become impossible.

16 Claims, 7 Drawing Sheets

SYSTEM AND METHOD FOR A REPLICATION PROTOCOL IN A REAL-TIME STATISTICAL ENGINE

CROSS REFERENCE TO RELATED APPLICATION

This application claims the benefit of U.S. Provisional Patent Application No. 62/687,324, titled "WEAKLY-CONSISTENT REAL-TIME STATISTICAL ENGINE SYSTEM", filed in the U.S. Patent and Trademark Office on Jun. 20, 2018, the contents of which are incorporated herein.

BACKGROUND

The present invention generally relates to telecommunications systems and methods, as well as statistical engines. More particularly, the present invention pertains to the prevention of data loss in statistical engines.

SUMMARY

A system and method are presented for a replication protocol in a real-time statistical engine. A real-time statistical engine monitors external data sources and uses received data to derive on-demand statistics. The engine may be comprised of a plurality of instances. In an embodiment with two instances of the engine, the instances are labeled as a primary instance and a backup instance. In case of primary instance failure, client servers of the engine are able to connect to the backup instance and obtain the same statistics with minimal data loss. The communication system between the primary instance and the backup instance may be used to exchange information about requested statistics, to clean unused statistics and to unconditionally delete statistics for which computation has become impossible.

In one embodiment, a method is presented for a replication protocol in a real-time statistical engine that monitors external data sources and uses received data to compute on-demand statistics, the method comprising the steps of: establishing a connection between a primary real-time statistical engine with a backup engine, wherein instances of the primary engine and the backup engine maintain finite state machines; performing a handshake between the primary engine and the backup engine; creating a statistic and transitioning the finite state machines from NULL to NEW; concurrently performing a replication procedure by the primary engine and the backup engine, wherein the statistic is replicated, an event is sent from the primary engine to the backup engine, and the finite state machines transition from NEW to SYNCING; concurrently performing a cleaning procedure on the statistic by the primary engine and the backup engine after the replication procedure has been performed; and concurrently performing a deletion procedure by the primary engine and the backup engine after the cleaning procedure has been performed, wherein, the finite state machine of the primary engine sends event deleted to the instance of the backup engine and transitions the finite state machine to DELETING, and acknowledging deletion by deleting the finite state machine of the backup engine by moving to terminal state NULL.

In another embodiment, a method is presented for a replication protocol in a real-time statistical engine that monitors external data sources and uses received data to compute on-demand statistics, the method comprising the steps of: establishing a connection between a first real-time statistical engine with a second engine, wherein instances of the first engine and the second engine maintain finite state machines; performing a hand shake between the first and second engines; creating a statistic and transitioning the finite state machines from a first state to a second state; concurrently performing a replication procedure by the first engine and the second engine, wherein replication of the statistic is attempted, an event replicate is sent, and finite state machines transition from the second state to a third state; concurrently performing a cleaning procedure on the statistic by the primary engine and the backup engine after the replication procedure has been performed, wherein the cleaning procedure comprises: determining that the statistic has no more clients, cleaning, by the first engine, by sending the statistic to the second engine, transitioning the state from the third state to a fourth state, and receiving a response from the second engine, wherein if the response is acknowledged, deleting the statistic, otherwise, if the response is not acknowledged, keeping the statistic and transitioning the finite state machine to a fifth state; and concurrently performing a deletion procedure by the first engine and the second engine after the cleaning procedure has been performed, wherein: the finite state machine of the first engine sends event deleted to the instance of the second engine and transitions the finite state machine to a sixth state, and acknowledging deletion by deleting the finite state machine by moving to the first state.

In another embodiment, a method is presented for a replication protocol in a real-time statistical engine that monitors external data sources and uses received data to compute on-demand statistics, the method comprising the steps of: establishing a connection between a primary real-time statistical engine with a backup engine, wherein instances of the primary engine and the backup engine maintain finite state machines; performing a handshake between the primary engine and the backup engine; creating a statistic and transitioning the finite state machines from NULL to NEW; concurrently performing a replication procedure by the primary engine and the backup engine, wherein the statistic is replicated, an event is sent from the primary engine to the backup engine, and the finite state machines transition from NEW to SYNCING; concurrently performing a cleaning procedure on the statistic by the primary engine and the backup engine after the replication procedure has been performed; and concurrently performing a deletion procedure by the primary engine and the backup engine after the cleaning procedure has been performed, wherein, the finite state machine of the primary engine sends event deleted to the instance of the backup engine, and during waiting for acknowledgement, the statistic is recreated, the finite state machine transitions to NEW_RECOVERY, and transitions the finite state to NEW when no acknowledgement is received.

DETAILED DESCRIPTION

Figure 1:
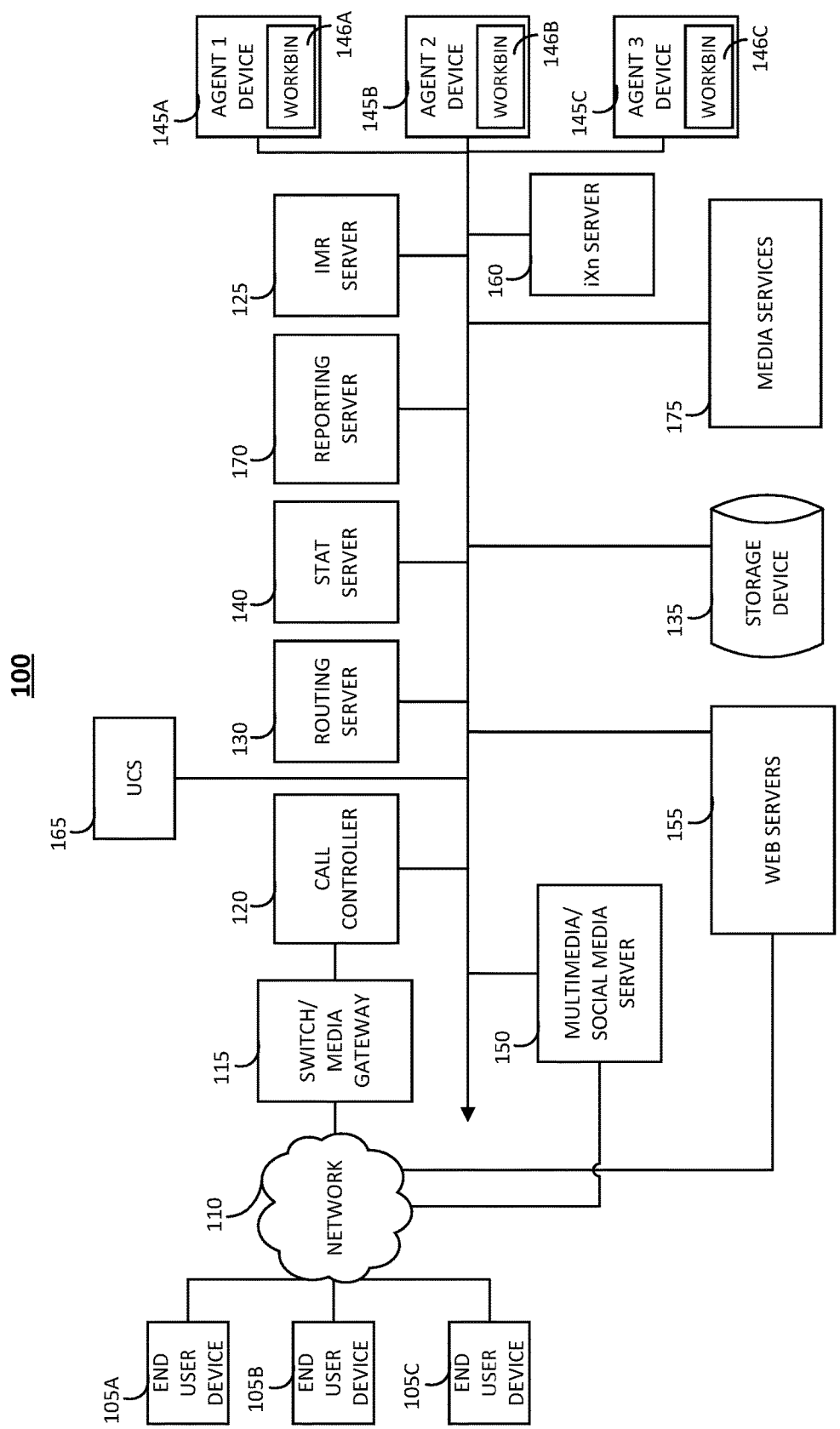
FIG. 1 is a diagram illustrating an embodiment of a contact center.

For the purposes of promoting an understanding of the principles of the invention, reference will now be made to the embodiment illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates.

With respect to the provision of statistics generated from statistical engines, it is desirable to have multiple instances of the statistical engines made available to the client computer systems of the statistical engines. With the provision of multiple instances of the statistical engine, in the case of failure of one of the instances of the statistical engine, another instance may be able to provide the requested statistic to the client computer system.

There are known design challenges presented to the creation of multiple instances in a distributed system. One tradeoff in the design of distributed systems is viewed as balancing the need of latency versus consistency. In a distributed system with low latency, if a client server connects to one instance of the distributed system, the client server may obtain a slightly different value for the statistic than if the client server connected to another instance of the distributed system. If the design criteria of the system are to ensure that values from multiple instances have identical values, then the latency of system increases.

Another tradeoff in the design of distributed systems is viewed as balancing the availability of the system versus consistency. In a distributed system where high availability is desired, the system is permitted to respond to a client server request for a value from one instance even if the other instance is not available. With high availability of the distributed system, it is preferable to respond to a client server request with some value rather than ensuring the provided value is the "best" value based on all of the instances. If consistency is desired over availability, then the distributed system may be designed to become unresponsive until another instance is available and can confirm the values are accurate.

In the case of the creation of a distributed system deploying a real-time statistical engine, the design criteria call for the system to have low latency and high availability. The performance of the statistical engine should provide hundreds to thousands of data requests to client servers on-demand and in real-time. As new data is constantly being generated for the statistics to be provided by the statistical engine, each individual piece of data is of minimal importance.

Currently-known solutions include the provision of two instances of the statistical engine, with one instance labeled as the "primary" instance and one instance labeled as the "backup" instance. The client server requesting the calculation of statistics from the statistical engine would connect to the primary instance under normal operation. If the client server attempts to connect to the primary instance and fails to connect to the primary instance, the client server can then attempt connecting to the backup instance to receive the statistic.

Problems arise from this currently-known solution when there is failure of the primary instance. After failure of the primary instance, the primary instance is restarted, which in turn resets the statistics data. When a client server opens a statistic from the primary instance that has been restarted, the statistic starts from zero. It is a particularly undesirable result for system operators without on-premises hardware as the system operator is unaware of the machinery happening behind the scenes. When the primary instance has been restarted, system operators will see their statistic values they are requesting have been unexpectedly reset to zero and may not be aware of the cause. The system operator may find this result unacceptable to have its requested statistics reset without notice or explanation.

Additional problems arise when the client server unknowingly or mistakenly connects to the backup instance where there has been no primary instance failure. In this case, the client server may not receive the requested statistic or that the statistic is unavailable despite being connected to an instance of the statistical engine. Again, for system operators without on-premise hardware, it may be more difficult for the system operator to assess the cause of the problem.

Another currently-known solution is to include having a persistent queue of events wherein both the primary instance and the backup instance would read events from the persistent queue. When the instances agree on the value received from the persistent queue the instances would have the same value for the same statistic. This solution would minimize any potential data loss in case of primary instance failure. This solution can make use of existing replication protocols like two-phase commit or Paxos (Paxos Made Simple, by L. Lamport, A C M, 2001) that ensure strict consistency between the instances. The problem with this approach is that an extraordinary amount of bandwidth and processing power is required to support this amount of communication between two instances and creates significant performance overhead. For distributed systems like statistical engines that require real-time reporting of data, it is acceptable to provide some value for the statistic on demand, even if another instance is not available, rather than delay reporting the statistic to the client server to permit the system to confirm the values from another instance.

No currently-known solution exists that meets the design criteria of a distributed real-time statistical engine system that has both low latency and high availability while also ensuring that data obtained from a backup instance of the statistical engine is a close approximation to the value that would be obtained from the primary instance. In systems where client servers requesting data of a relatively small set of potential data, currently-known solutions may be sufficient for their operation. However, in systems where the data-providing server is unable to determine in advance the information being requested by the clients of the server, or where it is desirable to determine the client-requested information in real-time, then the new approach to replication of statistics is necessitated.

Contact Center Systems

FIG. 1 is a diagram illustrating an embodiment of a communication infrastructure, indicated generally at 100. For example, FIG. 1 illustrates a system for supporting a contact center in providing contact center services. The contact center may be an in-house facility to a business or enterprise for serving the enterprise in performing the functions of sales and service relative to the products and services available through the enterprise. In another aspect, the contact center may be operated by a third-party service provider. In an embodiment, the contact center may operate as a hybrid system in which some components of the contact center system are hosted at the contact center premises and other components are hosted remotely (e.g., in a cloud-based environment). The contact center may be deployed on equipment dedicated to the enterprise or third-party service provider, and/or deployed in a remote computing environment such as, for example, a private or public cloud environment with infrastructure for supporting multiple contact centers for multiple enterprises. The various components of the contact center system may also be distributed across various geographic locations and computing environments and not necessarily contained in a single location, computing environment, or even computing device.

Components of the communication infrastructure indicated generally at 100 include: a plurality of end user devices 105A, 105B, 105C; a communications network 110; a switch/media gateway 115; a call controller 120; an IMR server 125; a routing server 130; a storage device 135; a statistics server 140; a plurality of agent devices 145A, 145B, 145C comprising workbins 146A, 146B, 146C; a multimedia/social media server 150; web servers 155; an iXn server 160; a UCS 165; a reporting server 170; and media services 175.

In an embodiment, the contact center system manages resources (e.g., personnel, computers, telecommunication equipment, etc.) to enable delivery of services via telephone or other communication mechanisms. Such services may vary depending on the type of contact center and may range from customer service to help desk, emergency response, telemarketing, order taking, etc.

Customers, potential customers, or other end users (collectively referred to as customers or end users) desiring to receive services from the contact center may initiate inbound communications (e.g., telephony calls, emails, chats, etc.) to the contact center via end user devices 105A, 105B, and 105C (collectively referenced as 105). Each of the end user devices 105 may be a communication device conventional in the art, such as a telephone, wireless phone, smart phone, personal computer, electronic tablet, laptop, etc., to name some non-limiting examples. Users operating the end user devices 105 may initiate, manage, and respond to telephone calls, emails, chats, text messages, web-browsing sessions, and other multi-media transactions. While three end user devices 105 are illustrated at 100 for simplicity, any number may be present.

Inbound and outbound communications from and to the end user devices 105 may traverse a network 110 depending on the type of device that is being used. The network 110 may comprise a communication network of telephone, cellular, and/or data services and may also comprise a private or public switched telephone network (PSTN), local area network (LAN), private wide area network (WAN), and/or public WAN such as the Internet, to name a non-limiting example. The network 110 may also include a wireless carrier network including a code division multiple access (CDMA) network, global system for mobile communications (GSM) network, or any wireless network/technology conventional in the art, including but not limited to 3G, 4G, LTE, etc.

In an embodiment, the contact center system includes a switch/media gateway 115 coupled to the network 110 for receiving and transmitting telephony calls between the end users and the contact center. The switch/media gateway 115 may include a telephony switch or communication switch configured to function as a central switch for agent level routing within the center. The switch may be a hardware switching system or a soft switch implemented via software. For example, the switch 115 may include an automatic call distributor, a private branch exchange (PBX), an IP-based software switch, and/or any other switch with specialized hardware and software configured to receive Internet-sourced interactions and/or telephone network-sourced interactions from a customer, and route those interactions to, for example, an agent telephony or communication device. In this example, the switch/media gateway establishes a voice path/connection (not shown) between the calling customer and the agent telephony device, by establishing, for example, a connection between the customer's telephony device and the agent telephony device.

In an embodiment, the switch is coupled to a call controller 120 which may, for example, serve as an adapter or interface between the switch and the remainder of the routing, monitoring, and other communication-handling components of the contact center. The call controller 120 may be configured to process PSTN calls, VoIP calls, etc. For example, the call controller 120 may be configured with computer-telephony integration (CTI) software for interfacing with the switch/media gateway and contact center equipment. In an embodiment, the call controller 120 may include a session initiation protocol (SIP) server for processing SIP calls. The call controller 120 may also extract data about the customer interaction, such as the caller's telephone number (e.g., the automatic number identification (ANI) number), the customer's internet protocol (IP) address, or email address, and communicate with other components of the system 100 in processing the interaction.

In an embodiment, the system 100 further includes an interactive media response (IMR) server 125. The IMR server 125 may also be referred to as a self-help system, a virtual assistant, etc. The IMR server 125 may be similar to an interactive voice response (IVR) server, except that the IMR server 125 is not restricted to voice and additionally may cover a variety of media channels. In an example illustrating voice, the IMR server 125 may be configured with an IMR script for querying customers on their needs. For example, a contact center for a bank may tell customers via the IMR script to 'press 1' if they wish to retrieve their account balance. Through continued interaction with the IMR server 125, customers may be able to complete service without needing to speak with an agent. The IMR server 125 may also ask an open-ended question such as, "How can I help you?" and the customer may speak or otherwise enter a reason for contacting the contact center. The customer's response may be used by a routing server 130 to route the call or communication to an appropriate contact center resource.

If the communication is to be routed to an agent, the call controller 120 interacts with the routing server (also referred to as an orchestration server) 130 to find an appropriate agent for processing the interaction. The selection of an appropriate agent for routing an inbound interaction may be based, for example, on a routing strategy employed by the routing server 130, and further based on information about agent availability, skills, and other routing parameters provided, for example, by a statistics server 140.

In an embodiment, the routing server 130 may query a customer database, which stores information about existing clients, such as contact information, service level agreement (SLA) requirements, nature of previous customer contacts and actions taken by the contact center to resolve any customer issues, etc. The database may be, for example, Cassandra or any NoSQL database, and may be stored in a mass storage device 135. The database may also be a SQL database and may be managed by any database management system such as, for example, Oracle, IBM DB2, Microsoft SQL server, Microsoft Access, PostgreSQL, etc., to name a few non-limiting examples. The routing server 130 may query the customer information from the customer database via an ANI or any other information collected by the IMR server 125.

Once an appropriate agent is identified as being available to handle a communication, a connection may be made between the customer and an agent device 145A, 145B and/or 145C (collectively referenced as 145) of the identified agent. While three agent devices are illustrated in FIG. 1 for simplicity, any number of devices may be present. Collected information about the customer and/or the customer's historical information may also be provided to the agent device for aiding the agent in better servicing the communication and additionally to the contact center admin/ supervisor device for managing the contact center. In this regard, each device 145 may include a telephone adapted for regular telephone calls, VoIP calls, etc. The device 145 may also include a computer for communicating with one or more servers of the contact center and performing data processing associated with contact center operations, and for interfacing with customers via voice and other multimedia communication mechanisms.

The contact center system 100 may also include a multimedia/social media server 150 for engaging in media interactions other than voice interactions with the end user devices 105 and/or web servers 155. The media interactions may be related, for example, to email, vmail (voice mail through email), chat, video, text-messaging, web, social media, co-browsing, etc. The multi-media/social media server 150 may take the form of any IP router conventional in the art with specialized hardware and software for receiving, processing, and forwarding multi-media events.

The web servers 155 may include, for example, social interaction site hosts for a variety of known social interaction sites to which an end user may subscribe, such as Facebook, Twitter, Instagram, etc., to name a few non-limiting examples. In an embodiment, although web servers 155 are depicted as part of the contact center system 100, the web servers may also be provided by third parties and/or maintained outside of the contact center premise. The web servers 155 may also provide web pages for the enterprise that is being supported by the contact center system 100. End users may browse the web pages and get information about the enterprise's products and services. The web pages may also provide a mechanism for contacting the contact center via, for example, web chat, voice call, email, web real-time communication (WebRTC), etc. Widgets may be deployed on the websites hosted on the web servers 155.

In an embodiment, deferrable interactions/activities may also be routed to the contact center agents in addition to real-time interactions. Deferrable interaction/activities may comprise back-office work or work that may be performed off-line such as responding to emails, letters, attending training, or other activities that do not entail real-time communication with a customer. An interaction (iXn) server 160 interacts with the routing server 130 for selecting an appropriate agent to handle the activity. Once assigned to an agent, an activity may be pushed to the agent, or may appear in the agent's workbin 146A, 146B, 146C (collectively 146) as a task to be completed by the agent. The agent's workbin may be implemented via any data structure conventional in the art, such as, for example, a linked list, array, etc. In an embodiment, a workbin 146 may be maintained, for example, in buffer memory of each agent device 145.

In an embodiment, the mass storage device(s) 135 may store one or more databases relating to agent data (e.g., agent profiles, schedules, etc.), customer data (e.g., customer profiles), interaction data (e.g., details of each interaction with a customer, including, but not limited to: reason for the interaction, disposition data, wait time, handle time, etc.), and the like. In another embodiment, some of the data (e.g., customer profile data) may be maintained in a customer relations management (CRM) database hosted in the mass storage device 135 or elsewhere. The mass storage device 135 may take form of a hard disk or disk array as is conventional in the art.

In an embodiment, the contact center system may include a universal contact server (UCS) 165, configured to retrieve information stored in the CRM database and direct information to be stored in the CRM database. The UCS 165 may also be configured to facilitate maintaining a history of customers' preferences and interaction history, and to capture and store data regarding comments from agents, customer communication history, etc.

The contact center system may also include a reporting server 170 configured to generate reports from data aggregated by the statistics server 140. Such reports may include near real-time reports or historical reports concerning the state of resources, such as, for example, average wait time, abandonment rate, agent occupancy, etc. The reports may be generated automatically or in response to specific requests from a requestor (e.g., agent/administrator, contact center application, etc.).

The various servers of FIG. 1 may each include one or more processors executing computer program instructions and interacting with other system components for performing the various functionalities described herein. The computer program instructions are stored in a memory implemented using a standard memory device, such as for example, a random-access memory (RAM). The computer program instructions may also be stored in other non-transitory computer readable media such as, for example, a CD-ROM, flash drive, etc. Although the functionality of each of the servers is described as being provided by the particular server, a person of skill in the art should recognize that the functionality of various servers may be combined or integrated into a single server, or the functionality of a particular server may be distributed across one or more other servers without departing from the scope of the embodiments of the present invention.

In an embodiment, the terms "interaction" and "communication" are used interchangeably, and generally refer to any real-time and non-real-time interaction that uses any communication channel including, without limitation, telephony calls (PSTN or VoIP calls), emails, vmails, video, chat, screen-sharing, text messages, social media messages, WebRTC calls, etc.

The media services 175 may provide audio and/or video services to support contact center features such as prompts for an IVR or IMR system (e.g., playback of audio files), hold music, voicemails/single party recordings, multi-party recordings (e.g., of audio and/or video calls), speech recognition, dual tone multi frequency (DTMF) recognition, faxes, audio and video transcoding, secure real-time transport protocol (SRTP), audio conferencing, video conferencing, coaching (e.g., support for a coach to listen in on an interaction between a customer and an agent and for the coach to provide comments to the agent without the customer hearing the comments), call analysis, and keyword spotting.

In an embodiment, the premises-based platform product may provide access to and control of components of the system 100 through user interfaces (UIs) present on the agent devices 145A-C. Within the premises-based platform product, the graphical application generator program may be integrated which allows a user to write the programs (handlers) that control various interaction processing behaviors within the premises-based platform product.

As noted above, the contact center may operate as a hybrid system in which some or all components are hosted remotely, such as in a cloud-based environment. For the sake of convenience, aspects of embodiments of the present invention will be described below with respect to providing modular tools from a cloud-based environment to components housed on-premises.

This disclosure is directed to the replication of statistics between multiple instances of a statistics server 140 in a contact center 100. A statistic is a small, live piece of data. In the context of statistics for a contact center, examples of statistics may include, but not be limited to: total number of received calls, number of calls abandoned, average speed to answer, and average handling time.

The statistics server may operate in real time, tracking information about customer interaction networks (contact center, enterprise-wide, or multi-enterprise telephony and computer networks). The statistics server also converts the data accumulated for directory numbers (DNs), agents, agent groups, and non-telephony-specific object types, such as e-mail and chat sessions, into statistically useful information, and passes these calculations to other applications that request data. For example, the statistics server sends data to the routing server 130 to inform the routing server about agent availability. The statistics server 140 provides contact center managers with a wide range of information, allowing organizations to maximize the efficiency and flexibility of customer interaction networks.

The statistics server 140 includes functionality that tracks what is happening at a particular DN. Exemplary functionality of the DN that the statistic server may track include, but is not limited to: whether the DN belongs to an agent station; an individual agent who moves between stations; an IVR; or a point in a PBX used for queuing or routing. For example, for each DN, the statistics server tracks DN activity, call activity on a DN, and other relevant derived states. Examples of derived states may include, but are not limited to: how long a phone is not in use, how long a call is on hold, how long it takes to dial a call, how long a DN is busy with an inbound call, etc. From the gathered information, the statistics server can perform statistical calculations to provide to the client servers of the statistics server. Examples of calculated statistics include the duration in current state, the total number of times each state occur, the cumulative time for each state, the percentage of time for each state, the average time for each state, and the maximum and minimum times for each statistic.

Figure 2:
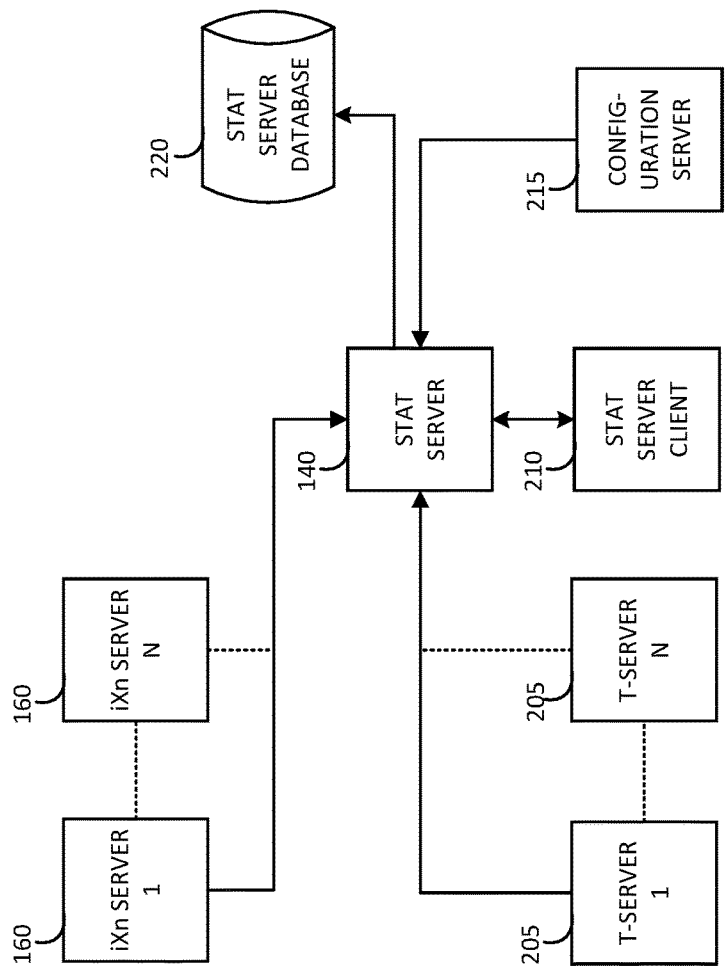
FIG. 2 is a diagram illustrating an embodiment of a statistics server with other servers.

FIG. 2 is a diagram illustrating an embodiment of a statistics server 140 with other servers, indicated generally at 200. In an embodiment, when a communication is received in the contact center 100, it may be distributed (based on agent availability and/or other parameters) to any of the following: an internal PBX point for queuing or routing, an IVR, an agent's DN. When an Internet interaction enters an e-mail, chat, or Web callback server, the interaction is routed through the interaction server 160 for processing, before it is sent on to the statistics server 140. Statistics server 140 monitors these various interactions tracking their status at any given moment, as well as historically over time.

In an embodiment of the statistics server 140, when an Internet interaction enters an e-mail, chat, or Web callback server, MS T-Server 205 emulates telephony events, so that statistics server behavior can be described in PBX terms. For example, a small contact center may create two different types of agent groups. One group handles calls in the main office and is defined by that location. Another group provides technical support; agents of this group work in different locations. In addition, a free-floating agent works at different stations; they can receive calls at any DN/media that they log in to.

In this example, statistics server 140 simultaneously monitors each DN/media and prepares statistical information for configured 215 agent groups and individual agents identified by a unique employee ID no matter where they are located. Statistics server 140 re-creates what an individual agent is doing, based on the state of his or her media devices, and factors that agent's work into the overall calculation for the entire group.

When the PBX routes a call to any of these agents, it also sends T-Server 205 a message identifying the DN to which the call has been delivered. T-Server 205 conveys that information to statistics server 140 and informs statistic server 140 whenever a change occurs in the condition of that DN. Statistics server updates 140 information about each agent group, each agent in a group, and all individual agents. Information may be stored by the statistics server 140 in stat server database 220.

The statistics calculated by the statistics server 140 as shown in FIG. 2 are each associated with a particular process stored on the statistic server. The derived statistics are determined on-demand when requested by a client server 210, rather than being derived before the statistic is requested by a client server. When client server 210 requests a particular statistic from the statistic server 140, the server starts computing the requested statistic. An example of a statistics calculated by the statistics server that the client server 210 wants derived is the total number of incoming calls at a contact center, received by a particular group of agents in a contact center over a set period of time. In this example, one instance of the statistics server 140 has been running since midnight, wherein the last time the statistics server was reset was at midnight. Now, the time is noon. In this example, during the twelve hours between the last time the statistics server was reset, there have been 2000 calls. This data of 2000 calls may be used to calculate statistics, for example, an average number of calls per hour, when presented with time data, such as 12 hours. This data may also be used with other received data, for example total calls abandoned, to complete additional statistics, such as percentage of calls abandoned.

According to an embodiment of the disclosed statistics server 140, to initiate creation of a pair of weakly-consistent synchronized instances of the disclosed statistic server, two unsynchronized and/or unconnected instances of the statistics server are first provided. An embodiment of the statistics server includes a first instance and a second instance of the statistics server. In a disclosed embodiment, one instance is labeled as the "primary" instance and the second instance is labeled as the "backup" instance. The designations for primary and backup instances will become somewhat arbitrary in this disclosure, but it is preferred to help differentiate the two instances when establishing synchronicity of the two instances.

In the disclosed embodiment, to synchronize the primary instance and the backup instance, the instance designated as the backup instance is tasked with initially connecting to the primary instance. Alternatively, the primary instance can be tasked with initially connecting to the backup instance, as long as the programming is consistent. It is critical that only one connection is established between the primary instance and the backup instance. Establishing a single connection between the primary instance and the backup instance ensures that there are not simultaneous connections between the instances, which would necessitate the instances performing conflict resolution to kill one of the two instances.

Figure 3:
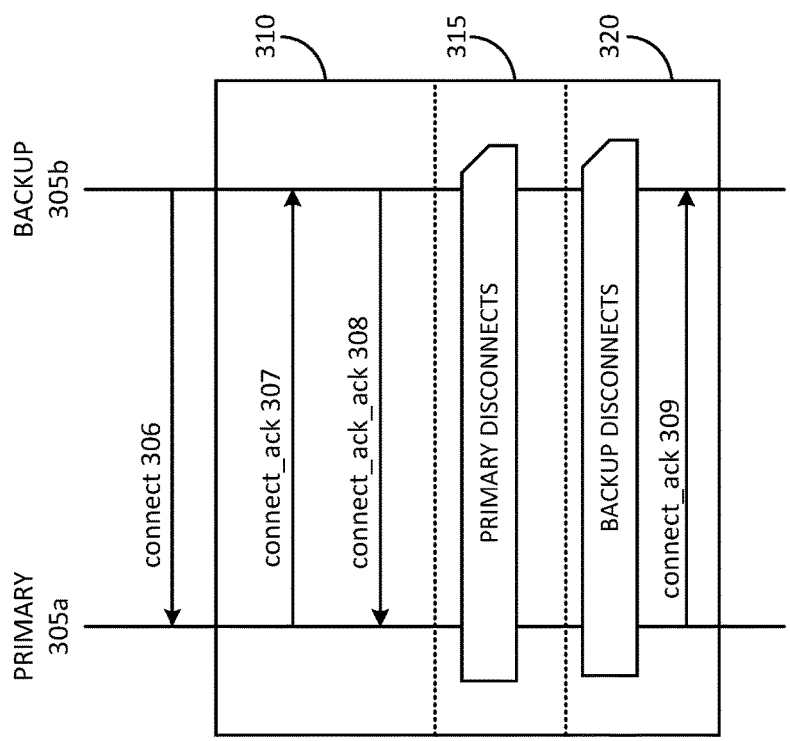
FIG. 3 is a sequence diagram illustrating an embodiment of a handshake protocol.

FIG. 3 is a sequence diagram illustrating an embodiment of a handshake protocol, indicated generally at 300. In an embodiment, two instances of the statistics server 305a, 305b, perform a handshake to establish the two instances as an HA (high availability) pair. The handshake between the two statistics server instances include the steps of having the primary instance 305a of the statistics server opening a port, the primary instance listens to the port, and the backup instance 305b connecting to the port of the primary instance. After the primary and backup instances perform these steps, primary and backup perform handshake. During handshake, primary instance and backup instance exchange configuration data to confirm the two instances can operate as an HA pair, as established through preset conditions. The configuration data for the primary instance and the backup instance may include, but not be limited to, information about the language of the two instances, the version of protocol of the two instances, and other hardware and software information. If the configuration data received by the primary instance from the backup instance meets the preset conditions to operate as an HA pair, then the backup instance 305b will send a connection acknowledgement 306 to the primary instance 305a. Upon receipt of the connection acknowledgement 306 by the primary instance 305a from the backup instance 305b, the primary instance 305a will send an acknowledgement 307 of the connection 306 back to the backup instance 305b. The backup instance 305b may additionally send an acknowledgment 308 of the connection acknowledgement 307 to the primary instance 305a. After the primary instance and backup instance exchange connection acknowledgements 310, the two instances are in a state where they can synchronize as an HA pair.

However, if the configuration data exchanged between the primary instance and the backup instance do not meet the preset conditions, or if there is a communication failure between the primary instance and backup instance, or if there is any type of failure that would prevent the primary instance and backup instance from synchronizing as an HA pair, then the instances would disconnect without sending connection acknowledgements. If the primary instance fails to receive a connection acknowledgement from the backup instance, then the primary instance will disconnect 315 from the backup instance and may provide an output that the backup instance is bad. If the backup instance fails to receive acknowledgement of the connection 309 from the primary instance, then the backup instance will disconnect 320 from the primary instance and may provide an output that the primary instance is bad.

After the primary instance and backup instance of the statistics server complete the handshake to establish the two instances as an HA pair, the primary instance and backup instance can begin synchronization of data between them. In a disclosed embodiment, the primary instance and backup instance can synchronize statistics that one or both of the instances of the statistics server have values for a particular statistic.

As discussed in greater detail in this disclosure, in a disclosed embodiment, one of the instances of the statistics server, when established as an HA pair, can request replication of a statistic. The other instance of the statistics server as part of the HA pair can respond with a replication "acknowledgement" if the other instance can determine the statistic, or a replication "not acknowledgement" if the other instance cannot determine the statistic. For example, if the instance of the statistic server designated as the backup instance as part of the HA pair, it then can connect to the primary instance of the HA pair. After they are connected, the primary instance then communicates to the backup instance the identification of a particular statistic, e.g., the total number of calls during the current calendar day. If the backup instance is unable to identify the particular statistic, then the backup instance can open the statistic from the primary instance and copy the aggregate of the particular statistic from the primary instance. Without the ability of the backup instance copying the aggregate of the particular statistic from the primary instance, the backup instance would provide a "zero" calculated value if the specific statistic is requested. In this example, if a client server connects to the backup instance and requests the total number of calls during the current calendar day, and the backup has completed copying the aggregate of the statistic from the primary instance, then the backup instance will be able to provide the correct statistic, such as 2000 total calls, instead of 0 total calls, as the correct value was obtained from the primary instance. When the statistic is created in certain instance, its finite state machine (FSM) moves from a terminal state (e.g. NULL) to state NEW for that statistic. The state NEW might comprise a state where a statistic is created, but not replicated/synchronized.

Figure 4:
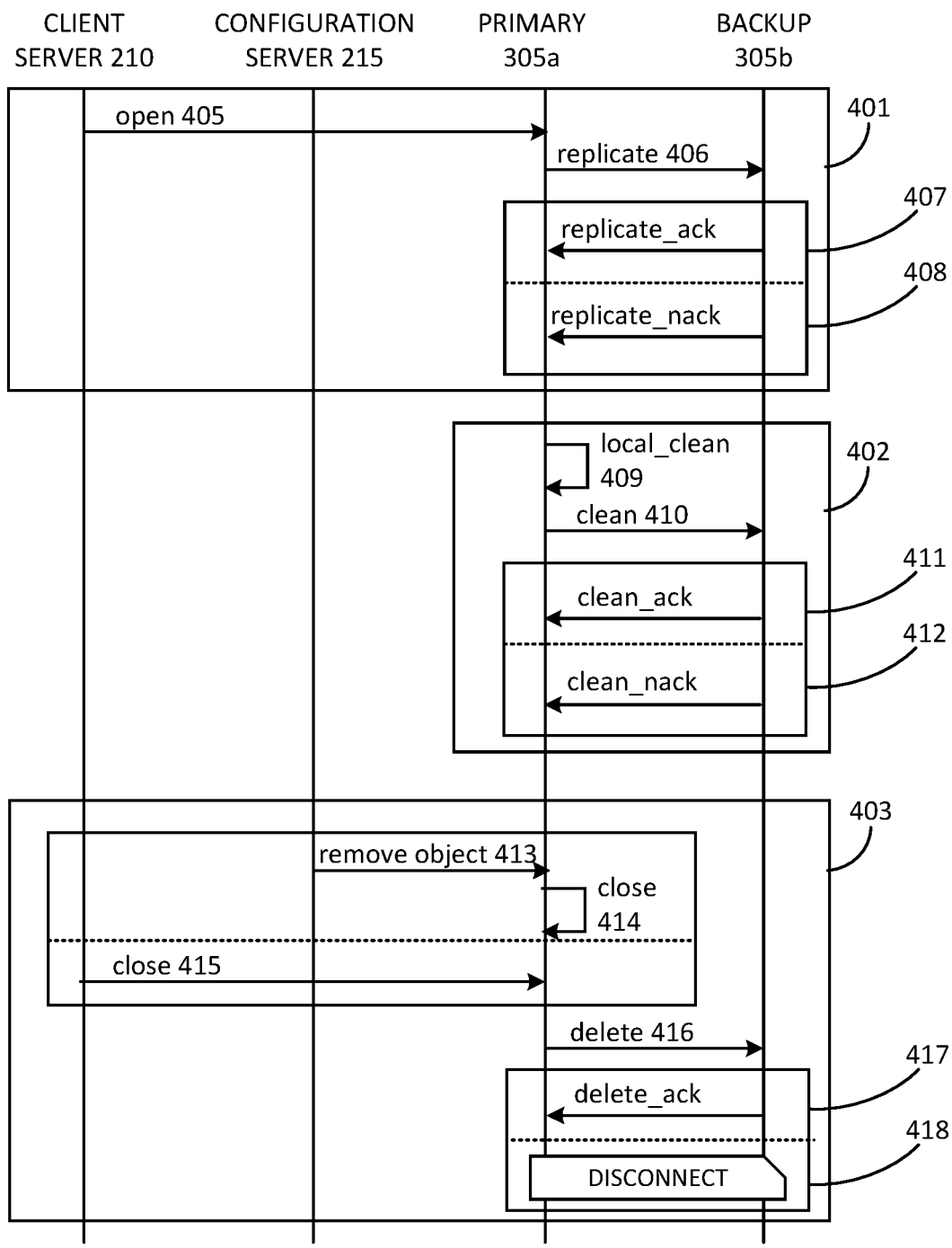
FIG. 4 is a sequence diagram illustrating an embodiment of statistics server operations.

FIG. 4 is a sequence diagram illustrating an embodiment of statistics server operations, indicated generally at 400. The three protocols in the disclosed embodiment include (1) a replication protocol; (2) a cleaning protocol; and a (3) deletion protocol. For each of the protocols, a primary instance 305a and a backup instance 305b of the statistics server 140 have been provided and have been configured as an HA pair according to the protocol shown in FIG. 3 or by other methods to create an HA pair of statistics server instances.

Replication Protocol

FIG. 4 illustrates an embodiment of the replication protocol 401 for replicating statistics between the primary instance 305a and backup instance 305b. Under the replication protocol 401, a particular statistic has been populated in both the primary instance 305a and backup instance 305b and the FSM has been set to NEW state. The disclosed replication protocol includes having the particular statistic is first opened 405 by a client server 210, herein the client server 210 requesting the particular statistic. If the particular statistic appears to have been already counted, then the statistic server does not need to initiate the replication protocol, and the particular statistic can be provided to the client server 210. However, if the particular statistic has not been counted, the statistics engine needs to check the value associated with the particular statistic from the other instance of the statistics engine. Initially, when a statistic is in a NEW state, a request for replication 406 is sent to another instance and the FSM moves to a waiting state. This waiting state might be named 'SYNCING'. The state comprises waiting for an acknowledgement of the replicate (e.g.

replicate_ack or replicate_nack). When another instance of the statistics engine responds to the instance requesting replication, the instance checks if it has the particular statistic. If the other instance does not have the statistic, then it opens the statistic.

If the other instance already has the statistic, the other instances respond with replicate acknowledgement 407, and provide the aggregate that the other instance has accumulated. It may happen that for the requesting instance that the statistic was first opened, but for other instances it was opened a significant time prior, where it already has accumulated a lot of data in the statistic. It would be beneficial for the requesting instance to start using the aggregated data accumulated by the other instance. The replication event is then concluded by exchanging a replication acknowledgment 407, if the replication is successful, or a replication "not acknowledgement" 408 if the replication is unsuccessful. If the replication acknowledgment is received as a response, then the FSM transitions to a state where the statistic is replicated/synchronized (a 'SYNCED' state). If the replication "not acknowledgement" is received, then the FSM transitions to a state of 'NEW_FROZEN' state or similar. A 'NEW_FROZEN' state comprises a state where another instance could not replicate the statistic. The attempt to replicate is not attempted again until a reconnect has occurred.

Cleaning Protocol

FIG. 4 illustrates a garbage collection or cleaning protocol 402. Under circumstances where there are no client servers demanding a particular statistic from the statistical engines for a certain period of time (a preset duration), then it is desirable to perform a cleaning protocol (or a 'garbage collection') to free up system resources to be used for more in-demand needs. To perform garbage collection for a particular statistic, the first instance 305a considers a statistic as obsolete after a set period of time, so the first instance will initiate garbage collection 410. But the first instance will not garbage collect until it gets the acknowledgement 411 from the second instance 305b. The necessary condition for a statistic to be cleaned is that there are no client servers acting during the preset duration for this particular statistic.

To perform garbage collection, the instance 305a with the obsolete statistic (the first instance, in this example) sends a CLEAN request 410 to the second instance 305b and the FSM moves the state to CLEANING while waiting for a response from the second instance. In an embodiment, the first instance 305a may also perform a local cleaning 409. The second instance 305b receives the CLEAN request from the first instance 305a and sends an acknowledgement 410 to first instance 305a if no client servers for the statistic in the second instance for the preset duration. If the second instance sends an acknowledgement 411, then both first instance 305a and second instance 305b will kill the statistic. The second instance may also respond with decline 412 to the cleaning (CLEAN DECLINE' or clean nack) to the first instance 305a if there are client servers for the statistic in the second instance 305b for the preset duration. If second instance sends CLEAN DECLINE, then both first instance and second instance will retain the statistic, and garbage collection will be unsuccessful. If the first instance receives CLEAN DECLINE from the second instance, then FSM transitions to a state SYNCED.

Deletion Protocol

FIG. 4 illustrates an embodiment of the deletion protocol 403 for deleting certain statistics populated in the primary instance 305a and backup instance 305b. Due to some circumstances, the statistics server may not be able to determine the desired statistic. The statistics server may not be able to determine the desired statistic due to a number of reasons, including that some object was deleted in the configuration, or the data was corrupted, or some other condition has occurred that disrupted the normal operation of the statistics server. Alternatively, the statistics server may not be able to determine the desired statistic as an intentional programming of the statistics server due to a change in configuration, for example. Since the statistic can no longer be derived, the statistic should be unconditionally deleted, however, symmetry between the two instances should be maintained. In a situation where the statistic has been deleted from one instance, but remains on the other instance, the deletion protocol ensures deletion of the protocol from both instances. The configuration server 215 may send a remove object request 413 to the primary instance 305a, which closes the statistic 414. The client server 415 additionally sends a close request to the primary instance 305a.

To perform the deletion protocol, the first instance 305a sends a "deleted" message 416 to the second instance 305b and moves the FSM state to a DELETING state (e.g., the statistic is being deleted, waiting for acknowledgement), and waits for a response (e.g., delete_ack) from the second instance 305b. If while the first instance 305a is waiting for a response from the second instance 305b for an acknowledgement of the deleted message the statistic is recreated, then the FSM moves to NEW_RECOVERY state. The 'NEW_RECOVERY' state may be rare and is entered when a statistic is recreated during an acknowledgement wait time. Otherwise, the second instance 305b receives the deleted message from the first instance and sends acknowledgement 417 to the first instance. When the first instance receives the response of deletion acknowledgement from the second instance, the FSM is deleted (i.e., moves to a terminal state) if it is in state DELETING, or moves to state NEW (if current state is NEW_RECOVERY). However, the second instance does not delete its own statistic. A NEW state may be entered in the event the instances are disconnected 418.

Figure 5:
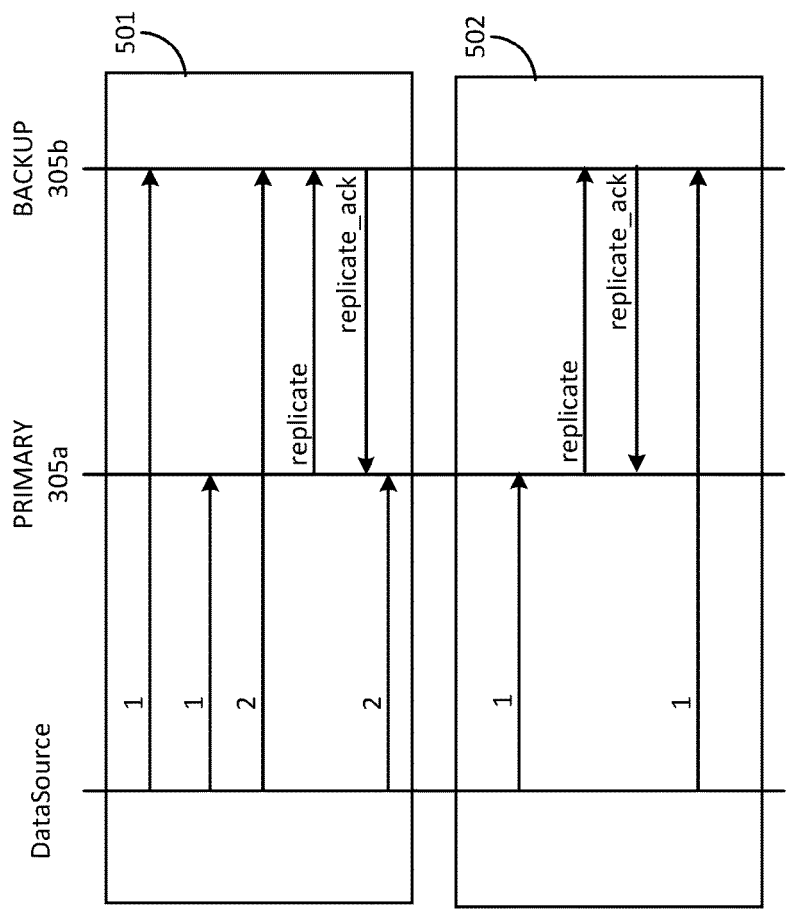
FIG. 5 is a sequence diagram illustrating an embodiment of statistics server operations.

FIG. 5 is a sequence diagram illustrating an embodiment of statistics server operations, indicated generally at 500. In an embodiment, FIG. 5 illustrates processes for resolving possible inconsistencies which might result from data loss or double counting during replication. After a period of time where the first instance 305a and second instance 305b of the statistics server have been running properly and configured as an HA pair, and the first instance 305a and second instance 305b have performed the replication protocol, it is possible that the values of a particular statistic may become unsynchronized after a period of time. For example, it is possible that both the first instance and second instance of the statistics server have the same statistic opened (e.g., total number of incoming calls during the current calendar day).

In the example 501, conflict resolution needs to be performed between the first instance 305a and the second instance 305b. To resolve the conflict, it must be decided which instance has the better values for the statistic.

For monotonically-growing statistics, the statistics server could consider a statistical value itself of the data for the statistic to be a criteria of the statistic. For monotonically-growing statistics, the bigger the value of the statistic, the better the aggregated data. However, in general, since most statistics are not monotonic, an update counter needs to be provided for each non-monotonically-growing statistic, which is incremented each time a new version of the statistic attempts to replace the prior version of the statistic. This use of a counter for each non-monotonically-growing statistic avoids reliance on system time, time stamps, or other unreliable methods. It is possible that the server may not be able to perform an update on the statistic because there has been a disconnection from the server, or that the server may be down and when the server is restarted, the instance may read aggregated data from a backup file. The incremental counter permits resolution of conflicts when there is a break in continuity of the statistical data. Here, the statistics server can compare the update counters between first instance and second instance and the statistics server can choose the statistic with the higher incremented update counter. In 501, the higher incremented update is 2. This enables conflict resolution for the data aggregates.

A second example 502 shows that conflict resolution is required. If one instance has the selected statistic (here, the primary instance 305*a*) while the other instance (305*b*) does not, there is no conflict between the two instances. The instance without the statistic replicates the statistic from the instance with the statistic.

Computer Systems

In an embodiment, each of the various servers, controls, switches, gateways, engines, and/or modules (collectively referred to as servers) in the described figures are implemented via hardware or firmware (e.g., ASIC) as will be appreciated by a person of skill in the art. Each of the various servers may be a process or thread, running on one or more processors, in one or more computing devices (e.g., FIGS. 6A, 6B), executing computer program instructions and interacting with other system components for performing the various functionalities described herein. The computer program instructions are stored in a memory which may be implemented in a computing device using a standard memory device, such as, for example, a RAM. The computer program instructions may also be stored in other non-transitory computer readable media such as, for example, a CD-ROM, a flash drive, etc. A person of skill in the art should recognize that a computing device may be implemented via firmware (e.g., an application-specific integrated circuit), hardware, or a combination of software, firmware, and hardware. A person of skill in the art should also recognize that the functionality of various computing devices may be combined or integrated into a single computing device, or the functionality of a particular computing device may be distributed across one or more other computing devices without departing from the scope of the exemplary embodiments of the present invention. A server may be a software module, which may also simply be referred to as a module. The set of modules in the contact center may include servers, and other modules.

The various servers may be located on a computing device on-site at the same physical location as the agents of the contact center or may be located off-site (or in the cloud) in a geographically different location, e.g., in a remote data center, connected to the contact center via a network such as the Internet. In addition, some of the servers may be located in a computing device on-site at the contact center while others may be located in a computing device off-site, or servers providing redundant functionality may be provided both via on-site and off-site computing devices to provide greater fault tolerance. In some embodiments, functionality provided by servers located on computing devices off-site may be accessed and provided over a virtual private network (VPN) as if such servers were on-site, or the functionality may be provided using a software as a service (SaaS) to provide functionality over the internet using various protocols, such as by exchanging data using encoded in extensible markup language (XML) or JSON.

Figure 6A:
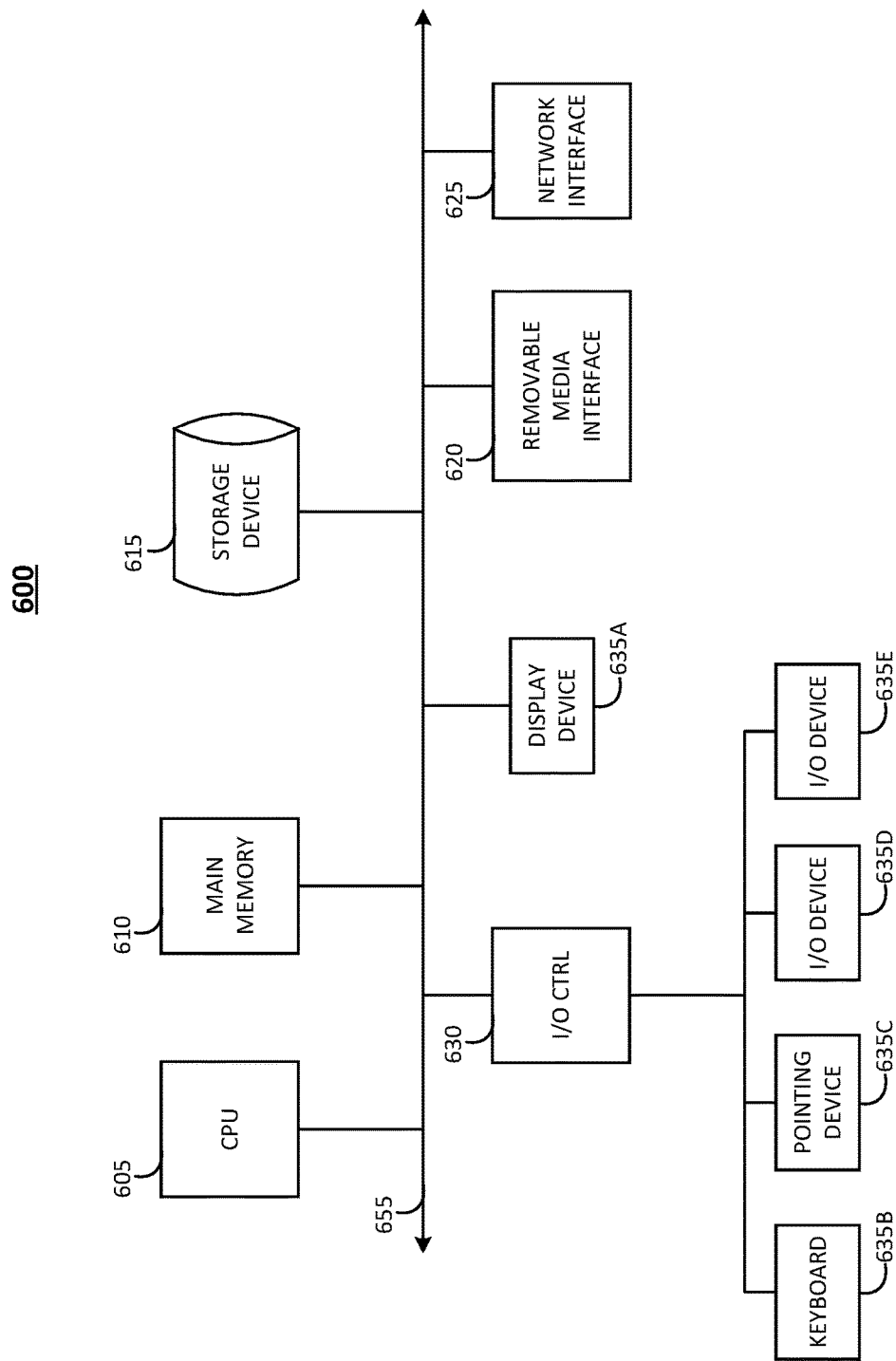
FIG. 6A is a diagram illustrating an embodiment of a computing device.
Figure 6B:
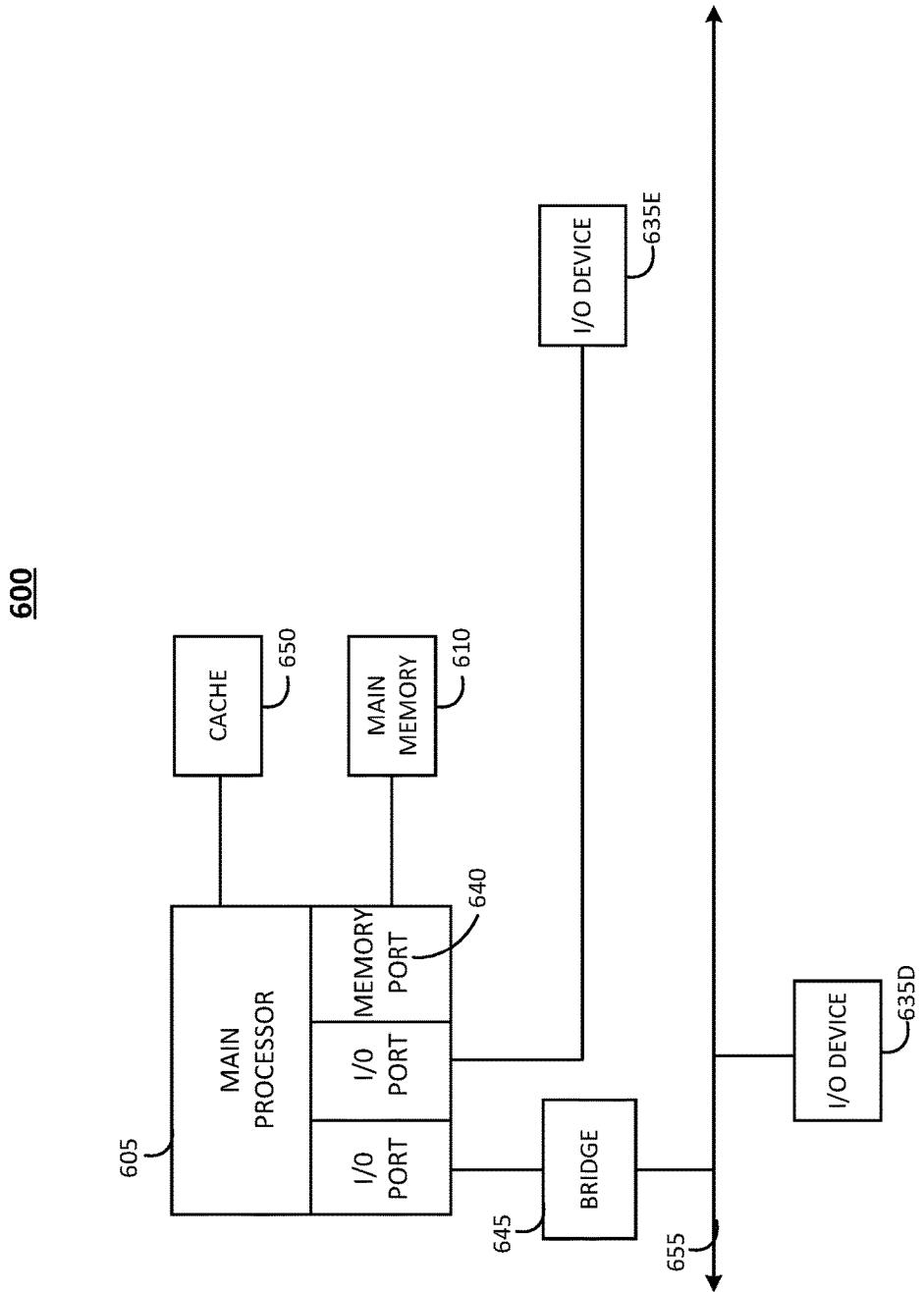
FIG. 6B is a diagram illustrating an embodiment of a computing device.

FIGS. 6A and 6B are diagrams illustrating an embodiment of a computing device as may be employed in an embodiment of the invention, indicated generally at 600. Each computing device 600 includes a CPU 605 and a main memory unit 610. As illustrated in FIG. 6A, the computing device 600 may also include a storage device 615, a removable media interface 620, a network interface 625, an input/output (I/O) controller 630, one or more display devices 635A, a keyboard 635B and a pointing device 635C (e.g., a mouse). The storage device 615 may include, without limitation, storage for an operating system and software. As shown in FIG. 6B, each computing device 600 may also include additional optional elements, such as a memory port 640, a bridge 645, one or more additional input/output devices 635D, 635E, and a cache memory 650 in communication with the CPU 605. The input/output devices 635A, 635B, 635C, 635D, and 635E may collectively be referred to herein as 635.

The CPU 605 is any logic circuitry that responds to and processes instructions fetched from the main memory unit 610. It may be implemented, for example, in an integrated circuit, in the form of a microprocessor, microcontroller, or graphics processing unit, or in a field-programmable gate array (FPGA) or application-specific integrated circuit (ASIC). The main memory unit 610 may be one or more memory chips capable of storing data and allowing any storage location to be directly accessed by the central processing unit 605. As shown in FIG. 6A, the central processing unit 605 communicates with the main memory 610 via a system bus 655. As shown in FIG. 6B, the central processing unit 605 may also communicate directly with the main memory 610 via a memory port 640.

In an embodiment, the CPU 605 may include a plurality of processors and may provide functionality for simultaneous execution of instructions or for simultaneous execution of one instruction on more than one piece of data. In an embodiment, the computing device 600 may include a parallel processor with one or more cores. In an embodiment, the computing device 600 comprises a shared memory parallel device, with multiple processors and/or multiple processor cores, accessing all available memory as a single global address space. In another embodiment, the computing device 600 is a distributed memory parallel device with multiple processors each accessing local memory only. The computing device 600 may have both some memory which is shared and some which may only be accessed by particular processors or subsets of processors. The CPU 605 may include a multicore microprocessor, which combines two or more independent processors into a single package, e.g., into a single integrated circuit (IC). For example, the computing device 600 may include at least one CPU 605 and at least one graphics processing unit.

In an embodiment, a CPU 605 provides single instruction multiple data (SIMD) functionality, e.g., execution of a single instruction simultaneously on multiple pieces of data. In another embodiment, several processors in the CPU 605 may provide functionality for execution of multiple instructions simultaneously on multiple pieces of data (MIMD). The CPU 605 may also use any combination of SIMD and MIMD cores in a single device.

FIG. 6B depicts an embodiment in which the CPU 605 communicates directly with cache memory 650 via a secondary bus, sometimes referred to as a backside bus. In other embodiments, the CPU 605 communicates with the cache memory 650 using the system bus 655. The cache memory 650 typically has a faster response time than main memory 610. As illustrated in FIG. 6A, the CPU 605 communicates with various I/O devices 635 via the local system bus 655. Various buses may be used as the local system bus 655, including, but not limited to, a Video Electronics Standards Association (VESA) Local bus (VLB), an Industry Standard Architecture (ISA) bus, an Extended Industry Standard Architecture (EISA) bus, a Micro Channel Architecture (MCA) bus, a Peripheral Component Interconnect (PCI) bus, a PCI Extended (PCI-X) bus, a PCI-Express bus, or a NuBus. For embodiments in which an I/O device is a display device 635A, the CPU 605 may communicate with the display device 635A through an Advanced Graphics Port (AGP). FIG. 6B depicts an embodiment of a computer 600 in which the CPU 605 communicates directly with I/O device 635E. FIG. 6B also depicts an embodiment in which local buses and direct communication are mixed: the CPU 605 communicates with I/O device 635D using a local system bus 655 while communicating with I/O device 635E directly.

A wide variety of I/O devices 635 may be present in the computing device 600. Input devices include one or more keyboards 635B, mice, trackpads, trackballs, microphones, and drawing tables, to name a few non-limiting examples. Output devices include video display devices 635A, speakers and printers. An I/O controller 630 as shown in FIG. 6A, may control the one or more I/O devices, such as a keyboard 635B and a pointing device 635C (e.g., a mouse or optical pen), for example.

Referring again to FIG. 6A, the computing device 600 may support one or more removable media interfaces 620, such as a floppy disk drive, a CD-ROM drive, a DVD-ROM drive, tape drives of various formats, a USB port, a Secure Digital or COMPACT FLASH™ memory card port, or any other device suitable for reading data from read-only media, or for reading data from, or writing data to, read-write media. An I/O device 635 may be a bridge between the system bus 655 and a removable media interface 620.

The removable media interface 620 may, for example, be used for installing software and programs. The computing device 600 may further include a storage device 615, such as one or more hard disk drives or hard disk drive arrays, for storing an operating system and other related software, and for storing application software programs. Optionally, a removable media interface 620 may also be used as the storage device. For example, the operating system and the software may be run from a bootable medium, for example, a bootable CD.

In an embodiment, the computing device 600 may include or be connected to multiple display devices 635A, which each may be of the same or different type and/or form. As such, any of the I/O devices 635 and/or the I/O controller 630 may include any type and/or form of suitable hardware, software, or combination of hardware and software to support, enable or provide for the connection to, and use of, multiple display devices 635A by the computing device 600. For example, the computing device 600 may include any type and/or form of video adapter, video card, driver, and/or library to interface, communicate, connect or otherwise use the display devices 635A. In an embodiment, a video adapter may include multiple connectors to interface to multiple display devices 635A. In another embodiment, the computing device 600 may include multiple video adapters, with each video adapter connected to one or more of the display devices 635A. In other embodiments, one or more of the display devices 635A may be provided by one or more other computing devices, connected, for example, to the computing device 600 via a network. These embodiments may include any type of software designed and constructed to use the display device of another computing device as a second display device 635A for the computing device 600. One of ordinary skill in the art will recognize and appreciate the various ways and embodiments that a computing device 600 may be configured to have multiple display devices 635A.

An embodiment of a computing device indicated generally in FIGS. 6A and 6B may operate under the control of an operating system, which controls scheduling of tasks and access to system resources. The computing device 600 may be running any operating system, any embedded operating system, any real-time operating system, any open source operation system, any proprietary operating system, any operating systems for mobile computing devices, or any other operating system capable of running on the computing device and performing the operations described herein.

The computing device 600 may be any workstation, desktop computer, laptop or notebook computer, server machine, handled computer, mobile telephone or other portable telecommunication device, media playing device, gaming system, mobile computing device, or any other type and/or form of computing, telecommunications or media device that is capable of communication and that has sufficient processor power and memory capacity to perform the operations described herein. In some embodiments, the computing device 600 may have different processors, operating systems, and input devices consistent with the device.

In other embodiments, the computing device 600 is a mobile device. Examples might include a Java-enabled cellular telephone or personal digital assistant (PDA), a smart phone, a digital audio player, or a portable media player. In an embodiment, the computing device 600 includes a combination of devices, such as a mobile phone combined with a digital audio player or portable media player.

A computing device 600 may be one of a plurality of machines connected by a network, or it may include a plurality of machines so connected. A network environment may include one or more local machine(s), client(s), client node(s), client machine(s), client computer(s), client device(s), endpoint(s), or endpoint node(s) in communication with one or more remote machines (which may also be generally referred to as server machines or remote machines) via one or more networks. In an embodiment, a local machine has the capacity to function as both a client node seeking access to resources provided by a server machine and as a server machine providing access to hosted resources for other clients. The network may be LAN or WAN links, broadband connections, wireless connections, or a combination of any or all of the above. Connections may be established using a variety of communication protocols. In one embodiment, the computing device 600 communicates with other computing devices 600 via any type and/or form of gateway or tunneling protocol such as Secure Socket Layer (SSL) or Transport Layer Security (TLS). The network interface may include a built-in network adapter, such as a network interface card, suitable for interfacing the computing device to any type of network capable of communication and performing the operations described herein. An I/O device may be a bridge between the system bus and an external communication bus.

In an embodiment, a network environment may be a virtual network environment where the various components of the network are virtualized. For example, the various machines may be virtual machines implemented as a software-based computer running on a physical machine. The virtual machines may share the same operating system. In other embodiments, different operating systems may be run on each virtual machine instance. In an embodiment, a "hypervisor" type of virtualizing is implemented where multiple virtual machines run on the same host physical machine, each acting as if it has its own dedicated box. The virtual machines may also run on different host physical machines.

Other types of virtualization are also contemplated, such as, for example, the network (e.g., via Software Defined Networking (SDN)). Functions, such as functions of session border controller and other types of functions, may also be virtualized, such as, for example, via Network Functions Virtualization (NFV).

In an embodiment, the use of LSH to automatically discover carrier audio messages in a large set of pre-connected audio recordings may be applied in the support process of media services for a contact center environment. For example, this can assist with the call analysis process for a contact center and removes the need to have humans listen to a large set of audio recordings to discover new carrier audio messages.

While the invention has been illustrated and described in detail in the drawings and foregoing description, the same is to be considered as illustrative and not restrictive in character, it being understood that only the preferred embodiment has been shown and described and that all equivalents, changes, and modifications that come within the spirit of the invention as described herein and/or by the following claims are desired to be protected.

Hence, the proper scope of the present invention should be determined only by the broadest interpretation of the appended claims so as to encompass all such modifications as well as all relationships equivalent to those illustrated in the drawings and described in the specification.

The invention claimed is:

1. A method for a replication protocol in a real-time statistical engine that monitors external data sources and uses received data to compute on-demand statistics, the method comprising the steps of:
   establishing a connection between a primary real-time statistical engine with a backup engine, wherein instances of the primary engine and the backup engine maintain finite state machines;
   performing a handshake between the primary engine and the backup engine;
   creating a statistic and transitioning the finite state machines from NULL to NEW;
   concurrently performing a replication procedure by the primary engine and the backup engine, wherein the statistic is replicated, an event is sent from the primary engine to the backup engine, and the finite state machines transition from NEW to SYNCING;
   concurrently performing a cleaning procedure on the statistic by the primary engine and the backup engine after the replication procedure has been performed; and
   concurrently performing a deletion procedure by the primary engine and the backup engine after the cleaning procedure has been performed, wherein,
      the finite state machine of the primary engine sends event deleted to the instance of the backup engine and transitions the finite state machine to DELETING, and
      acknowledging deletion by deleting the finite state machine of the backup engine by moving to terminal state NULL.

2. The method of claim 1 wherein the handshake comprises a security verification and a communication verification.

3. The method of claim 1, wherein the cleaning procedure further comprises the steps of:
   determining that the statistic has no more clients;
   cleaning, by the primary engine, by sending the statistic to the backup engine; and
   transitioning the state of the finite state machine to CLEANING.

4. The method of claim 3, wherein the cleaning procedure further comprises receiving a response from the backup engine, wherein if the response is acknowledged, deleting the statistic, otherwise, if the response is not acknowledged, keeping the statistic and transitioning the finite state machine to SYNCED.

5. A method for a replication protocol in a real-time statistical engine that monitors external data sources and uses received data to compute on-demand statistics, the method comprising the steps of:
   establishing a connection between a primary real-time statistical engine with a backup engine, wherein instances of the primary engine and the backup engine maintain finite state machines;
   performing a handshake between the primary engine and the backup engine;
   creating a statistic and transitioning the finite state machines from NULL to NEW;
   concurrently performing a replication procedure by the primary engine and the backup engine, wherein the statistic is replicated, an event is sent from the primary engine to the backup engine, and the finite state machines transition from NEW to SYNCING;
   concurrently performing a cleaning procedure on the statistic by the primary engine and the backup engine after the replication procedure has been performed; and
   concurrently performing a deletion procedure by the primary engine and the backup engine after the cleaning procedure has been performed, wherein,
      the finite state machine of the primary engine sends event deleted to the instance of the backup engine, and during waiting for acknowledgement, the statistic is recreated,
      the finite state machine transitions to NEW_RECOVERY, and
      transitions the finite state to NEW when no acknowledgement is received.

6. The method of claim 5 wherein the handshake comprises a security verification and a communication verification.

7. The method of claim 5, wherein the cleaning procedure comprises:
   determining that the statistic has no more clients;
   cleaning, by the primary engine, by sending the statistic to the backup engine; and
   transitioning the state of the finite state machine to CLEANING.

8. The method of claim 7, wherein the cleaning procedure further comprises receiving a response from the backup engine, wherein if the response is acknowledged, deleting the statistic, otherwise, if the response is not acknowledged, keeping the statistic and transitioning the finite state machine to SYNCED.

9. A method for a replication protocol in a real-time statistical engine that monitors external data sources and uses received data to compute on-demand statistics, the method comprising the steps of:

establishing a connection between a first real-time statistical engine with a second engine, wherein instances of the first engine and the second engine maintain finite state machines;

performing a hand shake between the first and second engines;

creating a statistic and transitioning the finite state machines from a first state to a second state;

concurrently performing a replication procedure by the first engine and the second engine, wherein replication of the statistic is attempted, an event replicate is sent, and finite state machines transition from the second state to a third state;

concurrently performing a cleaning procedure on the statistic by the primary engine and the backup engine after the replication procedure has been performed, wherein the cleaning procedure comprises:

determining that the statistic has no more clients, cleaning, by the first engine, by sending the statistic to the second engine, transitioning the state from the third state to a fourth state, and receiving a response from the second engine, wherein if the response is acknowledged, deleting the statistic, otherwise, if the response is not acknowledged, keeping the statistic and transitioning the finite state machine to a fifth state; and concurrently performing a deletion procedure by the first engine and the second engine after the cleaning procedure has been performed, wherein:

the finite state machine of the first engine sends event deleted to the instance of the second engine and transitions the finite state machine to a sixth state, and acknowledging deletion by deleting the finite state machine by moving to the first state.

10. The method of claim 9, wherein the first state comprises a terminal state.

11. The method of claim 9, wherein the second state comprises a creation state.

12. The method of claim 9, wherein the third state comprises a state waiting for acknowledgement.

13. The method of claim 9, wherein the fourth state comprises a cleaning state.

14. The method of claim 9, wherein the fifth state comprises synchronization of statistics.

15. The method of claim 9, wherein the sixth state comprises a statistic deletion state.

16. The method of claim 9 wherein the handshake comprises a security verification and a communication verification.

* * * * *